(12) United States Patent
Fadell

(10) Patent No.: US 8,706,863 B2
(45) Date of Patent: Apr. 22, 2014

(54) SYSTEMS AND METHODS FOR MONITORING DATA AND BANDWIDTH USAGE

(75) Inventor: Anthony Fadell, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 212 days.

(21) Appl. No.: 12/241,007

(22) Filed: Sep. 29, 2008

(65) Prior Publication Data

US 2010/0017506 A1    Jan. 21, 2010

Related U.S. Application Data

(60) Provisional application No. 61/082,160, filed on Jul. 18, 2008.

(51) Int. Cl.
    *G06F 15/173*      (2006.01)

(52) U.S. Cl.
    USPC ........... 709/224; 709/229; 455/405; 455/406; 455/408; 370/395.2

(58) Field of Classification Search
    USPC ....................................................... 709/224
    See application file for complete search history.

(56) References Cited

U.S. PATENT DOCUMENTS

| | | | | |
|---|---|---|---|---|
| 6,272,110 B1 * | 8/2001 | Tunnicliffe et al. | ........... | 370/232 |
| 6,970,692 B2 * | 11/2005 | Tysor | ........................ | 455/405 |
| 6,993,044 B2 * | 1/2006 | McKinnon et al. | ........... | 370/468 |
| 7,113,497 B2 * | 9/2006 | Cromer et al. | ................ | 370/338 |
| 7,167,699 B1 * | 1/2007 | Kretsinger | ................. | 455/405 |
| 7,415,038 B2 * | 8/2008 | Ullmann et al. | ............... | 370/468 |
| 7,478,151 B1 * | 1/2009 | Maiocco et al. | ............... | 709/223 |
| 7,493,407 B2 * | 2/2009 | Leedom et al. | ................ | 709/232 |
| 7,496,655 B2 * | 2/2009 | Gopalan et al. | ............... | 709/224 |
| 7,539,748 B2 * | 5/2009 | Williams | ........................ | 709/224 |
| 7,543,052 B1 * | 6/2009 | Cesa Klein | ................... | 709/224 |
| 7,552,208 B2 * | 6/2009 | Lubrecht et al. | .............. | 709/223 |
| 7,580,972 B2 * | 8/2009 | Jones et al. | .................... | 709/203 |
| 7,590,746 B2 * | 9/2009 | Slater et al. | .................... | 709/229 |
| 7,602,808 B2 * | 10/2009 | Ullmann et al. | .............. | 370/468 |
| 7,765,294 B2 * | 7/2010 | Edwards et al. | .............. | 709/224 |
| 2001/0054097 A1 * | 12/2001 | Chafe | ........................... | 709/224 |
| 2002/0194251 A1 * | 12/2002 | Richter et al. | ................. | 709/105 |
| 2003/0046396 A1 * | 3/2003 | Richter et al. | ................. | 709/226 |
| 2003/0079028 A1 * | 4/2003 | Kortum et al. | ................. | 709/229 |
| 2003/0154272 A1 * | 8/2003 | Dillon et al. | ................... | 709/223 |
| 2003/0208523 A1 * | 11/2003 | Gopalan et al. | ............... | 709/201 |
| 2004/0093512 A1 * | 5/2004 | Sample | ........................... | 713/201 |

(Continued)

*Primary Examiner* — Tauqir Hussain
(74) *Attorney, Agent, or Firm* — Meyertons, Hood, Kivlin, Kowert & Goetzel, P.C.

(57) ABSTRACT

Access to a communications network may be provided via a data provider that may charge for access. In some cases, the access fee may be related to the amount of network resources consumed (e.g., amount of data downloaded or bandwidth used). In some cases, a user may have access to a particular amount of data provider resources and be required to pay an additional fee for using resources in excess of the particular amount. To assist the user in managing his data resource consumption, a resource utilization component may provide different alerts and notices informing the user of current consumption, expected future consumption, and recommendations for reducing data provider resources consumed (e.g., stopping particular processes or data provider requests, such as downloading media). If several electronic devices in a network are connected to the same data provider resources, a network component may manage the data provider resource use among the several electronic devices (e.g., allow only particular users or devices access).

24 Claims, 3 Drawing Sheets

(56) References Cited

U.S. PATENT DOCUMENTS

| | | |
|---|---|---|
| 2004/0199634 A1* | 10/2004 | Jackowski et al. ............ 709/226 |
| 2004/0199635 A1* | 10/2004 | Ta et al. ........................ 709/226 |
| 2004/0264501 A1* | 12/2004 | Zalitzky et al. ............... 370/468 |
| 2006/0251116 A1* | 11/2006 | Bedingfield et al. .......... 370/468 |
| 2007/0121525 A1* | 5/2007 | Jenster .......................... 370/252 |
| 2007/0133603 A1* | 6/2007 | Weaver et al. ................ 370/468 |
| 2007/0180119 A1* | 8/2007 | Khivesara et al. ............ 709/226 |
| 2008/0002711 A1* | 1/2008 | Bugenhagen ............... 370/395.2 |
| 2008/0096524 A1* | 4/2008 | True et al. ..................... 455/406 |
| 2008/0244061 A1* | 10/2008 | Kime ............................ 709/224 |
| 2008/0273591 A1* | 11/2008 | Brooks et al. ........... 375/240.01 |
| 2009/0068984 A1* | 3/2009 | Burnett ........................ 455/408 |
| 2009/0125409 A1* | 5/2009 | Barton ........................... 705/26 |

* cited by examiner

SYSTEMS AND METHODS FOR MONITORING DATA AND BANDWIDTH USAGE

CROSS-REFERENCE TO RELATED APPLICATION

This application claims the benefit of U.S. Provisional Application No. 61/082,160, filed Jul. 18, 2008, which is incorporated by reference herein in its entirety.

BACKGROUND OF THE INVENTION

This invention relates to metering of data usage in a system or device connected to a data service provider.

"Data providers," such as cellular network providers and Internet Service Providers, charge users to access and to post data from remote data resources such as web servers and mail servers. Data providers may charge based upon connection time or as a fixed recurring fee. In these instances, the data providers have traditionally allowed unlimited bandwidth (i.e. unlimited data size transfer). However, with the increase in connection speed affordability and in the size of files transferred, users have increased data consumption dramatically leading at times to congestion and utilization stress on data providers.

In addition, different protocols have been developed for allowing users to share files or other data between electronic devices. For example, the advent of peer-to-peer protocols and applications allowing peer-to-peer transfers of files (such as Limewire and Bearshare) have permitted a large network of users to transfer increasingly larger and larger amounts of data with few limits.

Recently, media files which are typically of very large relative size are also being increasingly transferred to portable electronic devices and computer systems. For example, with the advent of electronic purchasing of media, such as music and video, many users have stopped purchasing physical CDs and DVDs and have instead downloaded desired media to their devices. As another example, content providers now allow content to be rented electronically by enabling time-restricted downloading of media—downloaded media expires and can no longer be played back when a delay lapses (e.g., 30 days from date of rental, or 24 hours from beginning playback of the media). The portable electronic media device (e.g. Apple's iPod®) revolution has increased significantly the overall consumption of data provider resources.

Because of the wide disparity in types of data transfer some devices or users may use disproportionately more data provider resources (e.g., bandwidth) than others. In fact, some data providers have found that a mere 5% of users (e.g., power users) may be responsible for 50% of consumed resources.

The data providers may increasingly alter the mechanism for charging users from a fixed or connection time based fees to usage-based fees. In such instances, data providers would charge users for the amount of data transferred in a given time window similar to mechanisms employed by electric or natural gas utility companies. There may thus be a need to monitor data usage and provide users, data providers, or both with the means to effectively manage such pricing mechanisms.

SUMMARY OF THE INVENTION

The various embodiments of the invention describe metering, modeling, alerting a user to, and managing data provider resource utilization by a subscriber. This may include providing notifications, scheduling, application control, and switching or load balancing between different data provider resources (where more than one is available). These functions may be implemented in a centralized manner, distributed manner, or both and may also arbitrate among several devices accessing the same data provider resources.

BRIEF DESCRIPTION OF THE DRAWINGS

The various embodiments of the invention are set forth in the following detailed description, taken in conjunction with the accompanying drawings, in which like reference characters refer to like parts throughout, and in which.

DETAILED DESCRIPTION

Figure 1:
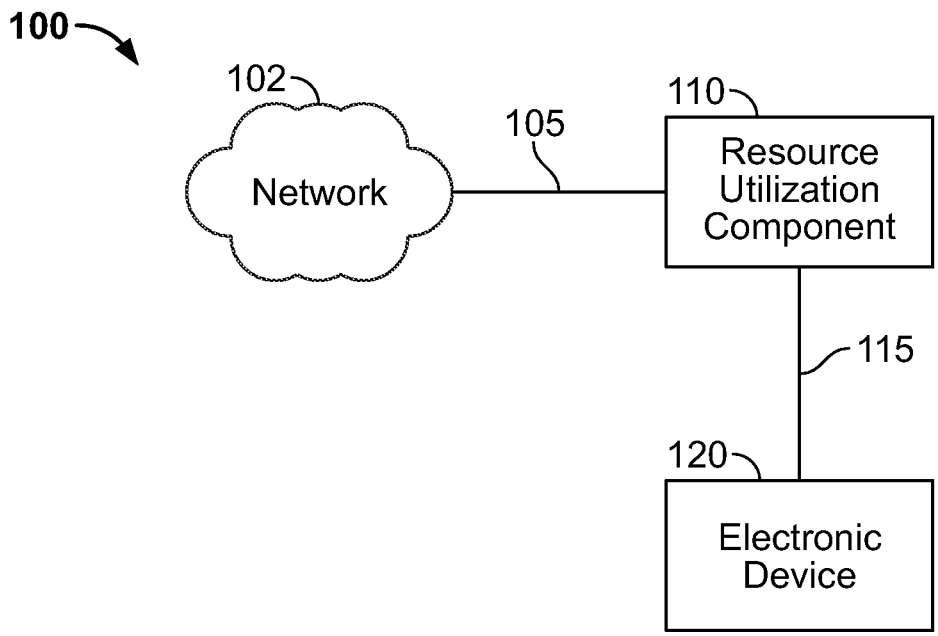
FIG. 1 is a simplified block diagram of a system in accordance with at least one embodiment of the invention.

Data providers may charge for access based on the amount of resources consumed (e.g., the amount of data transferred by a subscriber). In some embodiments, the data provider may provider tiers or subscriptions by which a subscriber (e.g., a user or electronic device on a network) may use up to a limit of data provider resources for a fixed fee, and pay an additional per resource consumed fee in excess of the limit. Additionally, the data provider can provide differentiated pricing based upon the direction of data transfer ("upstream" to the provider, for example uploading, versus "downstream" from the provider, for example downloading), time-of-day (e.g. peak and non-peak) and even dynamically based upon resource availability at the time of transfer.

To assist a subscriber in managing their usage under such pricing mechanisms, a resource utilization component within the subscriber's network (e.g., downstream of the data provider) may monitor their utilization, provide alerts at certain thresholds, and/or perform utilization shifting actions such as application control and scheduling. The resource utilization component may include any suitable network component or electronic device operative to provide access or be used to access data provider resources. The resource utilization component may provide any suitable notification or information to subscribers or data provider resource consumers. For example, a subscriber may receive notices of the amount of resources utilized and the amount of resources remaining during the subscription period. The notices may be provided periodically or when particular conditions are met, such as for example when the consumer's consumption reaches a given threshold or falls within a particular range. The threshold or range may be defined using any suitable approach, including for example based on an expected constant use of data provider resources, the day or time within the subscription period, known or monitored prior consumption of data provider resources by the consumer, or any other suitable approach. In some embodiments, the threshold or range may be dynamically defined and change based on any suitable factor (e.g., resources consumed, resources remaining, time remaining in the subscription period), or may even factor in a dynamic allocation by the data provider to the subscriber based upon network conditions or availability of resources.

When the resource utilization component determines that the subscriber is within a particular range of the data provider resource limit, or has reached a particular threshold, the resource utilization component may provide several options or automate certain actions to assist a subscriber in managing his resource utilization so as to mitigate subscription costs. For example, the resource utilization component may prevent the subscriber from consuming any further resources. As another example, the types of resources consumed may be restricted, such that resource consumption associated with applications, protocols or data types that require significant resources are restricted (e.g., limit media downloads). As still another example, the resource utilization component may prompt the subscriber to purchase access to or authorize the purchase of additional data provider resources. In some embodiments, only the particular consumer (who may not be the subscriber per se) who purchased the additional resources may consume the additional resources.

In other management aspects, when a particular subscriber has access to several communications networks, or several data providers for accessing the same (or different) data (e.g., over a Wi-Fi network and a cellular network), the subscriber may switch between networks or data providers based on the resources consumed on each network via each data provider. For example, if a subscriber has consumed significant resources using a first network, but no resources using a second network, the subscriber may switch from the first network to the second network (e.g., automatically or in response to a user instruction) to continue to consume resources, but to avoid exceeding a resource limit on either network. In some embodiments, the subscriber may choose to dedicate particular networks to different types of resource consumptions or data transfers (e.g., use Wi-Fi to download media or access web pages, but use a cellular network to check e-mail).

As is often the case, several electronic devices may be connected via a network and together access remote sources using the same data provider (e.g. home or office local area networks). To ensure an equitable distribution of resources, the data provider resource utilization may be allocated appropriately (e.g. load balanced) among the electronic devices. For example, the resources may be allocated equally, or differently (e.g., based on prior resource consumption, expected resource consumption, or the type of device). The consumption by each individual electronic device may be managed using any suitable mechanism, including any of the mechanisms described above in connection with a single consumer.

FIG. 1 is a simplified block diagram of a system in accordance with at least one embodiment of the invention. System 100 may include a network 102, a resource utilization component 110 and an electronic device 120. Network 102 may be connected to resource utilization component 110 using communications path 105. Resource utilization component 110 may be connected to electronic device 120 using communications path 115 (which may include an interface within electronic device 120 when resource utilization component 110 is embedded in electronic device 120). In some embodiments, several electronic devices 120 or other network devices may be connected to resource utilization component 110, to each other in a local area network, or both. Further, electronic device 120 may be connected to several resource utilization components 110 to access the same or different networks 102. For simplicity, only one of network 102, resource utilization component 110 and electronic device 120 are shown.

Resource utilization component 110 may measure the resources provided by network 102 that are used by electronic device 120. For example, resource utilization component 110 may measure the amount of data transferred to or from electronic device 120 (e.g., uploads or downloads), the bandwidth used by electronic device 120, or any other suitable quantity for measuring network resource use. Resource utilization component 110 may be operative to monitor the resource use and to provide notices or warnings to electronic device 120 when particular resource use thresholds are met. In some embodiments, resource utilization component 110 may be operative to adjust the resource consumption of electronic device 120 (e.g., reduce or prevent access to network resources, change networks, modify attributes of transferred files or of the transfer of files).

Network 102 may include any suitable communications network or data network to and from which electronic device 102 may transfer data. In some embodiments, network 120 may include a network to which access is on a pay to use basis. For example, a pay-to-use network may include a network to which access is provided by an Internet Service Provider (e.g., AT&T, Comcast, Earthlink, Netzero, Cablevision, Time Warner), a cellular service provider (e.g., AT&T, Verizon, T-Mobile, Sprint, O2, Rogers, Orange), or any other suitable pay to use network. In some embodiments, network 102 may include an intranet, an extranet, the Internet, or combinations of these. Network 102 may be provided for by a data provider (not shown) and can include a cellular network, a cable network, a public switched telephone network, a satellite network, or any other suitable type of network. Network 102 may include a network of any suitable size or topology.

Network 102 may support any suitable communications protocol for transmitting data within network 102 or for transmitting data to or from electronic devices 120 that are coupled to the network (e.g., over communications link 105). In some embodiments, network 102 may support any suitable protocol at different layers. For example, network 102 may support Layer 1 protocols (Physical layer) such as ISDN, PDH, DSL (digital subscriber line) or any other suitable Layer 1 Protocol. Network 102 may also support Layer 2 protocols (Data link layer) such as ARCnet, Dynamic Trunking Protocol, Ethernet, IEEE 802.11, IEEE 802.16, LLDP, PPP, PPTP, or any other suitable Layer 2 protocol. Network 102 may also support Layer 3 protocols (Network layer) such as ARP, BGP, EGP, ICMP, IP, IPSec, IPX, MPLS, RIP, or any other suitable Layer 3 protocol. Network 102 may also support Layer 4 protocols (Transport layer) such as AH, ESP, SCCP, TCP, UDP, or any other suitable Layer 4 protocol. Network 102 may also support Layer 5 protocols (Session layer) such as NCP, NFS, SMB or any other suitable Layer 5 protocol. Network 102 may also support Layer 7 protocols (Application layer) such as AFP, BitTorrent, BOOTP, DNS, DHCP, Gnutella, HTTP, IMAP, IRC, MIME, NTP, POP3, RTP, SSH, SIP, SMPT, Telnet, TFTP, or any other suitable Layer 7 protocol.

In some embodiments, network 102 may support other communications protocols or connection types, such as, for example, CAN, CIP, automation protocols, SOCKS, Bluetooth (registered trademark), high frequency systems (e.g., 900 MHz, 2.4 GHz, and 5.6 GHz communication systems), infrared, or any other suitable other protocol or connection type. In some embodiments, network 102 may include a cellular network providing for data transfers using any suitable network such as, for example, GSM, AMPS, GPRS, CDMA, EV-DO, EDGE, 3GSM, DECT, IS-136/TDMA, iDen, LTE or any other suitable cellular network providing for data transfers (e.g., voice or other data) at any suitable speed.

Network 102 may include any suitable hardware for providing data transfers to and from electronic device 120. For example, network 102 may include one or more repeaters, hubs, bridges (e.g., local bridges, remote bridges and wireless bridges), switches, and routers. The various network hardware components may be coupled using any suitable connection, including for example wired (e.g., metal or fiber optic cables) or wireless connections.

To access network 102, resource utilization component 110 may act as a gateway to electronic device 120 to access the resources of network 102. In some embodiments, resource utilization component may be embedded in electronic device (e.g., as an electrical component or as software operating on the electronic device). Resource utilization component 110 may include any suitable component operative to provide electronic device 120 with access to resources of network 102. For example, resource utilization component 110 may include a router, modem (e.g., cable modem), network interface controller, communications signal processor, or any other suitable component allowing electronic device 120 to connect to network 102. In some embodiments, resource utilization component 110 may include a network component provided by the data provider such that the data provider may authorize, monitor, and monetize access to network 102. The data provider may include any entity operative to provide access to resources of network 102 such as, for example, an Internet Service Provider (e.g., AT&T, Comcast, Earthlink, NetZero, Cablevision, Time Warner), a cellular service provider (e.g., AT&T, Verizon, T-Mobile, Sprint, O2, Rogers, Orange), or any other suitable data provider.

Electronic device 120 may connect to network 102 using any suitable communications path 115. For example, communications path 115 may include any suitable wired or wireless communications path. In some embodiments, electronic device 120 may be coupled to resource utilization component 110 via a separate network component, such as for example a hub, router, or network interface controller. A router, for example, may allow several electronic devices 120 to simultaneously connect to and access network 102 via resource utilization component 110. In some embodiments, the several electronic devices may be connected to each other (e.g., instead of or in addition to connecting to resource utilization component 110).

Electronic device 120 may include any suitable electronic device for accessing resources of network 102, for example to transfer data. For example, electronic device 120 may include a media player such as an iPod® available by Apple Inc., of Cupertino, Calif., a cellular telephone (e.g., an iPhone® available from Apple Inc.), personal digital assistants (PDAs), a desktop computer, a laptop computer, gaming console, set-top box, television system or television system component (e.g., a recording device), and any other device capable of communicating via a wire or wirelessly (with or without the aid of an enabling accessory) with resource utilization component 110. If resource utilization component 110 is embedded in electronic device 120, electronic device 120 may be operative to access network 102 directly. Electronic device 120 may be a mobile device or relatively fixed in location or network location.

Figure 2:
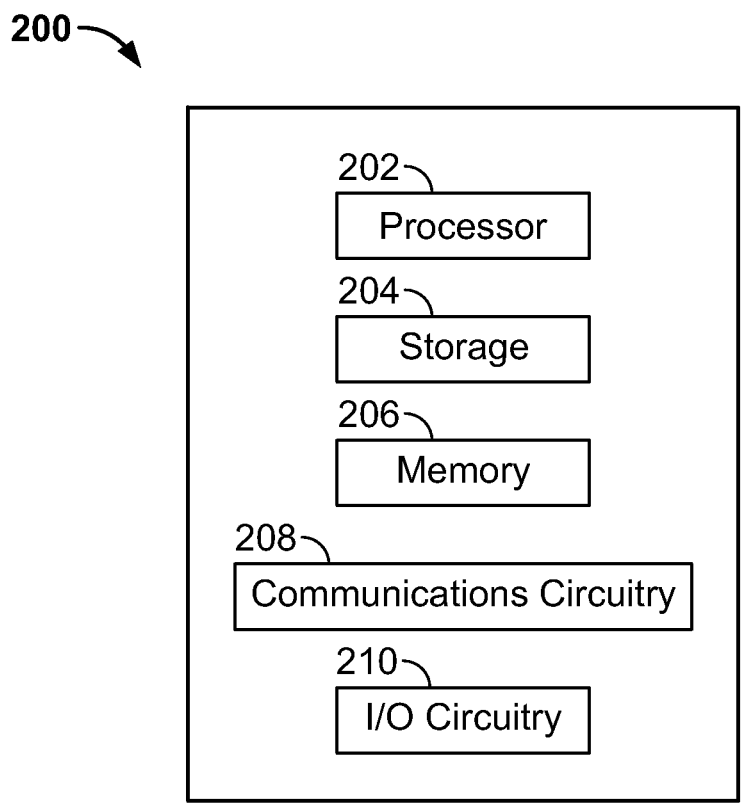
FIG. 2 is a block diagram of an illustrative electronic device for use with the system of FIG. 1 in accordance with at least one embodiment of the invention.

FIG. 2 is a block diagram of an illustrative electronic device for use with the system of FIG. 1 in accordance with at least one embodiment of the invention. Electronic device 200 may include processor 202, storage 204, memory 206, communications circuitry 208, input/output circuitry 210. In some embodiments, one or more of electronic device components 200 may be combined or omitted (e.g., combine storage 204 and memory 206). In some embodiments, electronic device 200 may include other components not combined or included in those shown in FIG. 2 (e.g., a display, bus, or input mechanism), or several instances of the components shown in FIG. 2. For the sake of simplicity, only one of each of the components is shown in FIG. 2.

Processor 202 may include any processing circuitry operative to control the operations and performance of electronic device 200. For example, processor 202 may be used to run operating system software, firmware, media playback applications, media editing applications, communications applications, and/or any other application. In some embodiments, processor 202 may be operative to run applications and perform operations associated with a resource utilization component, including for example monitoring network resource usage, adjusting network resource usage, providing notices to a user, or any other suitable operation. In some embodiments, a processor may drive a display and process inputs received from a user interface.

Storage 204 may include, for example, one or more storage mediums including a hard-drive, flash memory, permanent memory such as ROM, any other suitable type of storage component, or any combination thereof. Storage 204 may store, for example, media data (e.g., music and video files), application data (e.g., for implementing functions on device 200), firmware, user preference information data (e.g., media playback preferences), lifestyle information data (e.g., food preferences), exercise information data (e.g., information obtained by exercise monitoring equipment), transaction information data (e.g., information such as credit card information), wireless connection information data (e.g., information that may enable electronic device 200 to establish a wireless connection), subscription information data (e.g., information that keeps track of podcasts or television shows or other media a user subscribes to), contact information data (e.g., telephone numbers and email addresses), calendar information data, and any other suitable data or any combination thereof.

Memory 206 can include cache memory, semi-permanent memory such as RAM, and/or one or more different types of memory used for temporarily storing data. In some embodiments, memory 206 can also be used for storing data used to operate electronic device applications, or any other type of data that may be stored in storage 204. In some embodiments, memory 206 and storage 204 may be combined as a single storage medium.

Communications circuitry 208 can permit device 200 to communicate with one or more networks or other devices using any suitable communications protocol such as a resource utilization component (e.g., resource utilization component 110 accessing network 102, FIG. 1). For example, communications circuitry 208 may support Wi-Fi (e.g., a 802.11 protocol), Ethernet, Bluetooth™ (which is a trademark owned by Bluetooth Sig, Inc.), other radio frequency systems, cellular networks (e.g., GSM, AMPS, GPRS, CDMA, EV-DO, EDGE, 3GSM, DECT, IS-136/TDMA, iDen, LTE or any other suitable cellular network providing for data transfers), infrared, TCP/IP, Voice over IP (VOIP), any other communications protocol, or any combination thereof.

Electronic device 200 may include one or more instances of communications circuitry 208 for simultaneously performing several communications operations using different communications networks, although only one is shown in FIG. 2 for simplicity. For example, electronic device 200 may include a first instance of communications circuitry 208 for communicating over a cellular network, and a second instance of communications circuitry 208 for communicating over Wi-Fi or using Bluetooth. In some embodiments, the same instance of communications circuitry 208 may be operative to provide for communications over several communications networks.

Input/output circuitry 210 may be operative to convert (and encode/decode, if necessary) analog signals and other signals into digital data. In some embodiments, input/output circuitry can also convert digital data into any other type of signal, and vice-versa. For example, input/output circuitry 210 may receive and convert physical contact inputs (e.g., from a multi-touch screen), physical movements (e.g., from a mouse), analog audio signals (e.g., from a microphone), or any other input. The data can be provided to and received from processor 202, storage 204, memory 206, or any other component of electronic device 200. Although input/output circuitry 210 is illustrated in FIG. 2 as a single component of electronic device 200, a plurality of input/output circuitry can be included in electronic device 200.

Electronic device 200 may include any suitable mechanism or component for allowing a user to provide inputs to input/output circuitry 210. For example, electronic device 200 may include any suitable input mechanism, such as for example, a button, keypad, dial, a click wheel, or a touch screen. In some embodiments, electronic device 200 may include a capacitive sensing mechanism, or a multi-touch capacitive sensing mechanism such as found in an iPhone. The input mechanism may include any of the features of the input mechanisms described above in connection with electronic devices 120 (FIG. 1) and 200 (FIG. 2).

As part of input/output circuitry 210, electronic device 200 can include output circuitry associated with output devices such as, for example, one or more audio outputs. The audio output may include one or more speakers (e.g., mono or stereo speakers) built into electronic device 200, or an audio component that is remotely coupled to electronic device 200 (e.g., a headset, headphones or earbuds that may be coupled to communications device with a wire or wirelessly).

In some embodiments, I/O circuitry 210 may include display circuitry (e.g., a screen or projection system) for providing a display visible to the user. For example, display circuitry 212 may include a screen (e.g., an LCD screen) that is incorporated in electronic device 200 and associated drivers, graphics processors or other integrated circuits. As another example, display circuitry 212 may include a movable display or a projecting system for providing a display of content on a surface remote from electronic device 200 (e.g., a video projector). The display circuitry also can include display driver circuitry, circuitry for driving display drivers, or both. The display circuitry may be operative to display content (e.g., media playback information, application screens for applications implemented on the electronic device, information regarding ongoing communications operations, information regarding incoming communications requests, or device operation screens) under the direction of processor 202.

In some embodiments, the display circuitry can include a coder/decoder (Codec) to encode or decode digital data into analog signals (and vice versa), or compress and decompress data. For example, the display circuitry (or other appropriate circuitry or applications running on electronic device 200) may include video Codecs such as H.261, MPEG-1, MPEG-2, H.263, MPEG-4, DivX, Xvid, FFmpeg, x264, WMV, RealVideo, Sorenson 3, audio Codecs such as AIFF, RIFF, WAV, ALAC, DST, MPEG-4, Dolby Digital, MP1, MP2, MP3, AAC, or any other suitable type of Codec.

In some embodiments, electronic device 200 may include a bus operative to provide a data transfer path for transferring data to, from, or between control processor 202, storage 204, memory 206, communications circuitry 208, input/output circuitry 210, and any other component included in the electronic device.

The data provider associated with the one or more electronic devices (e.g., electronic device 120, FIG. 1) may monitor (e.g., meter) the amount of data transferred by each particular electronic device or user (collectively identified as consumers) associated with each subscriber (e.g., the one paying for the data provider resources). Such monitoring may allow the data provider to identify those devices or users that use the largest amount of data provider resources. Although the following discussion will describe embodiments of the invention in the context of a consumer, it will be understood that the embodiments may also be applied to a subscriber. To discourage or reduce excessive usage of data provider resources, the data provider may allocate to each subscriber or consumer a particular amount of data provider resources. For example, based on the tier or type of service purchased, each consumer may be allocated a particular amount of data provider resources. The data provider may allocate available resources using any suitable approach. For example, the data provider may allocate to each consumer particular amounts of received data (e.g., each user may receive 2 GB of data per month), an amount of available bandwidth (e.g., no user may use more than 0.01% of the available bandwidth, or no download at speeds exceeding 500 Mb/s), access to data provider resources at particular times or days (e.g., access only during nighttime hours), or any other suitable allocation (e.g., a measurable quantity) of data provider resources. The allocation may be fixed (e.g., a particular amount of data per unit of time) or dynamic (e.g., a percentage of available bandwidth or other resources). In some embodiments, the measurable quantity may be cumulative, such that the data provider and the user may quantify the amount of resources consumed over a particular time period (e.g., monthly consumption of data provider resources).

The data provider may provide any suitable number or types of resource consumption tiers or plans. For example, the data provider may provide periodic plans by which a user may be entitled to a particular amount of data provider resources (e.g., a particular amount of received or transmitted data) for a particular period (e.g., one month). In some embodiments, the data provider may provide different resource consumption tiers based on different measurable quantity of data provider resources consumed (e.g., a data plan based on permitted bandwidth and a data plan based on amount of data received). The data provider may prevent users from exceeding the data provider resource usage set by the selected tier or plan, or may instead or in addition charge a premium for the consumption of resources in excess of those allowed by the selected plan. For example, the data provider may allow a user to transfer 1 GB through an Internet gateway (e.g., through a cable modem provided by the data provider), and may charge a fixed fee per MB of data transferred within the tier subscription period (e.g., one month) up to 5 GB transferred, at which point the data provider may refuse to transfer any more data until the next tier period begins. In some embodiments, the data provider may roll over unused resources from a prior subscription period (e.g., unused data transfer credits) to a current or future subscription period.

In some embodiments, a data provider may provide different tiers or plans based on the type of network being used. For example, a data provider may allow a first amount of resources to be consumed through a cable modem, a second amount of resources to be consumed through a DSL line, a third amount of resources to be consumed over a 3G cellular network, and a fourth amount of resources to be consumed over an EDGE cellular network. The data provider may associate different types of resources and different amounts of resources for each network type (e.g., a total data transfer over the DSL line, and a bandwidth limitation over the 3G network).

In some embodiments, a data provider may provide different tiers for resources based on the type of data received or transmitted by the consumer. For example, if data providers determine that the consumers accounting for the disproportionate share of data provider resources tend to consume a particular type of data (e.g., media), or data using a particular protocol or transmission method (e.g., BitTorrent or peer-to-peer), data providers may only meter and limit or charge for the particular type of data or data transmitted using the particular protocol or transmission method. For example, data providers may provide different tiers of service for accessing data provider resources required to consume the determined particular type of data or to use the particular protocol or transmission method. In some cases, small resource allocations may be included in a standard tier, so as not to adversely affect the casual or occasional consumer of the particular data type or consumer of the determined protocol or transmission method. As another example, if data providers determine that the consumers accounting for the disproportionate share of data provider resources tend to consume a particular type of data provider resource, such as for example uploading data (e.g., due to BitTorrent or peer-to-peer transmission protocols), the data provider may partially or entirely remove the particular type of resource from standard data provider resource tiers (e.g., so that users uploading data must pay extra). This approach may be of particular interest if, for example, consumption of a particular type of resource is generally associated with power users or users of the disproportionate share of resources (e.g., the consumers using upstream resources are also those using a disproportionately large amount of downstream resources).

The data provider may meter the use of each consumer (e.g., each user or each electronic device) using any suitable approach. In some embodiments, because the data provider may provide the gateway (e.g., the resource utilization component) to the network (e.g., the Internet) requested by the consumer, the data provider may monitor the data requests made to the gateway or the data transfers actually passing through the gateway (e.g., downstream, upstream, or both) and thus accurately meter the resources consumed by each consumer associated with the particular gateway. In some embodiments, the data provider may make available to each consumer a report that indicates the amount of resources used, the amount of resources still available to the user on one or more network types, or any other suitable information.

In some embodiments, each consumer may instead or in addition monitor or meter his personal use of system resources. For example, if a consumer has a resource utilization component (e.g., a router, a computer or other electronic device) downstream of the data provider gateway (e.g., if the resource utilization component is not provided by the data provider, or if the consumer can access or control the data provider provided resource utilization component), the consumer may monitor the data transfers and other resource uses at the resource utilization component to receive an accurately monitored view of data provider resources used. The consumer may monitor at any suitable time, including for example as a background process (e.g., running without input from the user), a process started and stopped by the user (e.g., to monitor use at particular times), or any other suitable time. In some embodiment, the consumer may maintain a log of resources consumed, for example to provide reports of resource consumption at particular times or by particular consumers.

The resource utilization component may, in some embodiments, include an application or other code operative to provide monitored statistics to the user. For example, the resource utilization component may be operative to compare the resources used with the amount of resources allocated to each user (e.g., based on the limits associated with allocated data provider resources) and provide reports, notices, reminders, or alarms to the user. It will be understood that in some embodiments, the reports, notices, reminders, or alarms may be provided to each consumer directly by the data provider (e.g., instead of or in addition to the resource utilization component).

The consumer may receive any suitable type of report, notice, reminder or alarm related to data provider resource consumption. For example, the consumer may receive a notice of the amount (e.g., in absolute terms, relative to allocated amount, or combinations of these) of resources consumed for a tier subscription period. As another example, the consumer may receive an indication of expected resources to be consumed in a particular period based on a rate of current consumption. Received notices may include calculations of expected penalties to be paid (e.g., if the used resources are expected to exceed the allotted resources), resources not consumed, amount of roll over resources expected to be consumed, or any other indication of cost or expected cost for the period's resource consumption. In some embodiments, the consumer may instead or in addition receive periodic (e.g., daily, weekly, bi-weekly, monthly) notices of current resource use (e.g., since last report, or cumulatively since last period) to allow the consumer to manage his resource consumption. If the user's resource allocation is dynamically determined (e.g., as a percentage of a dynamic quantity), the consumer may receive notices indicating the current resources allocated to the consumer (e.g., the current amount of bandwidth) so that the consumer may adjust his consumption (e.g., perform a more resource intensive process). For example, if the data provider detects an unforeseen decrease or increase in available resources, the data provider may provide a notice of the change in available resources to the consumer. In some embodiments, the consumer may receive a notice only if the change in resources exceeds a particular threshold (e.g., the available resources double or decrease by half).

Figure 3:
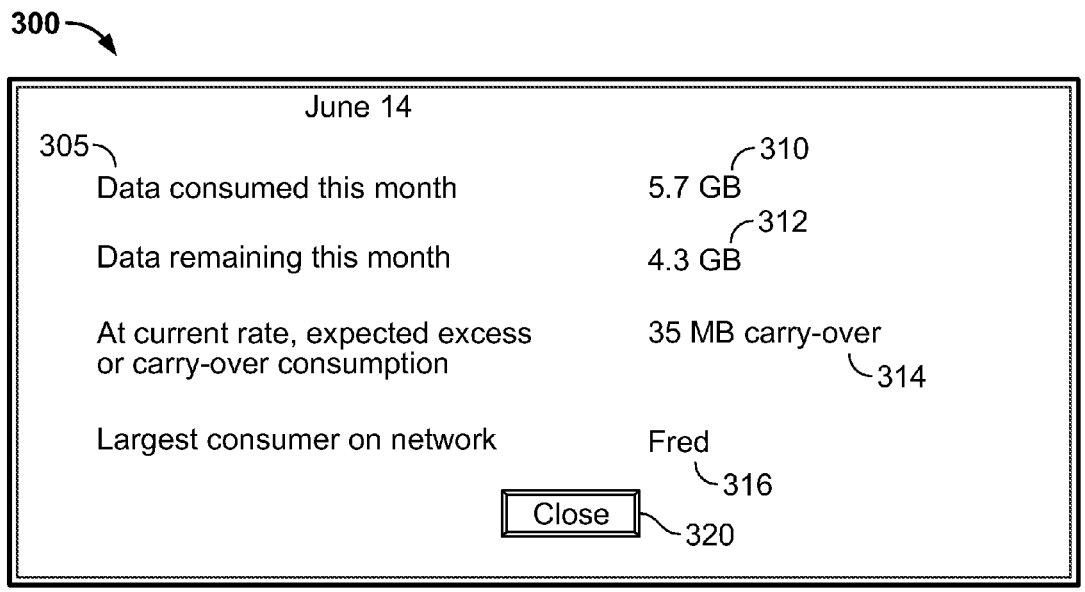
FIG. 3 is an illustrative screen of a notice of data provider resources used in accordance with at least one embodiment of the invention.

FIG. 3 is an illustrative screen of a notice of data provider resources used in accordance with at least one embodiment of the invention. Screen 300 may be generated and transmitted to the consumer by any suitable component, including for example a router or network component downstream from the resource utilization component, or directly from the data provider. Screen 300 may include notifications 305 with data resource usage information. For example, screen 300 may include notification 310 of the data consumed for the current period (e.g., current month) and notification 312 of the data remaining for the current period. In some embodiments, the information provided to the consumer may include an estimation of expected data usage for the remaining period and a comparison of the estimated usage with the allocated data provider resources. Alternatively, the consumer may determine, based on the current time or date and data consumed as of that time or date, the expected data usage. Screen 300 may include notification 314 of the expected excess consumption or carry-over for the period (e.g., month). In the example of FIG. 3, at the consumer's current rate of resource consumption, a carry-over is expected. Screen 300 may also identify the largest consumer (notification 316) of data provider resources within a network of devices coupled to the data provider (e.g., so that the network administrator may modify or re-allocate data provider resources within the network). Screen 300 may instead or in addition include any other information related to the consumption of data provider resources, such as for example percentages of resources consumed or remaining, instructions to cut back on resource use (e.g., a personal message from a network administrator to the consumer), or any other suitable information. Screen 300 may include Close option 320 to remove or hide screen 300.

To assist the consumer in avoiding excess fees or penalties, the consumer may receive (e.g., from the data provider or from the resource utilization component) reminders or alarms that the user is approaching, has reached, or has exceeded his allocated data provider resources. For example, in response to determining that the consumer is within a particular range of the allocated data processor resources (e.g., within a particular amount of allocated transferred data, or within a particular percentage of the allocated bandwidth) or that the consumer has reached an initial limit or threshold that is less than the allocated resource limit (e.g., the user has consumed 75% of the allocated resources), the consumer may receive an alert indicating the current status of the consumer's resource use. The range may be determined using any suitable approach. For example, the consumer may define the range (e.g., by providing a suitable input). As another example, the resource utilization component may define the range (e.g., using a range known to allow consumers to manage their resource consumption). In some embodiments, the range may change dynamically, for example based on the day within the subscription period (e.g., based on a proportional or non-linear estimation of resource consumption during the period). As another example, the user's prior consumption may be monitored such that variations to a linear estimation or discernable patterns of data provider resource consumption may be used to dynamically modify the range (e.g., to provide a personalized dynamic range reflecting the consumer's history and expected behavior).

In response to receive the alert, the consumer may modify his resource consumption to avoid exceeding the allocated resource amount. In some embodiments, the alert may include an option for restricting or limiting the amount of resources subsequently used by the consumer. For example, the alert may include an option for preventing the consumer from receiving data that would cause the consumer to exceed the allocated data provider resources. In response to receiving the user selection of the option to limit resource use, the consumer may instruct the resource utilization component to prevent all data transfers that would exceed the resources allocated to the consumer. In some embodiments, the resource utilization component may automatically prevent all data transfers that would exceed the resources allocated to the consumer in response to determining that the data resource allocation limit has been met.

In some embodiments, the alert may instead or in addition include an option for allowing the consumer to exceed the allocated resources. For example, the alert may include an option permitting the resource utilization component to transmit or receive data in excess of the resources allocated to the consumer. The option may include one or more restrictions to prevent excessive consumption beyond the allocated data provider resources. For example, the consumer may restrict unauthorized consumers from exceeding the allocated data provider resource limit, or may prevent particular types of data transfers (e.g., large data transfers consuming significant data provider resources) from occurring (e.g., if the consumer is an administrator or has sufficient privileges within the local network). As another example, the consumer may change the properties of the data being downloaded, such as by changing the display size of a media file to be displayed or by switching from a more resource intensive Codec to a less resource intensive Codec for playing back the media. The option may include a prompt for a password, other authentication information, or payment information (e.g., credit card information) to be entered prior to allowing the consumer to exceed the allocated data provider resources. In some embodiments, the consumer may automatically purchase access to additional data provider resources (e.g., without requiring a user interaction), but provide a notice that additional resources were purchased. In some embodiments, the option may only allow the consumer to exceed the resource limit by a particular amount before a new alert is provided or a new request for authorization or payment is displayed (e.g., can only exceed up to limit of next data provider resource tier).

Figure 4:
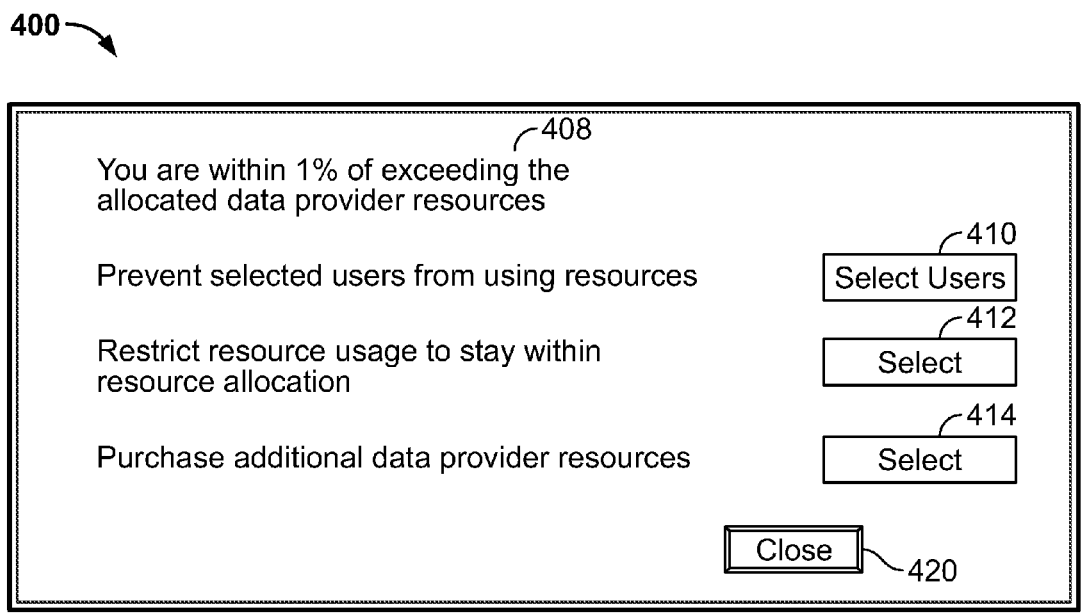
FIG. 4 is an illustrative screen indicating that the consumer has reached a limit in data provider resources in accordance with at least one embodiment of the invention.

FIG. 4 is an illustrative screen indicating that the consumer has reached a limit in data provider resources in accordance with at least one embodiment of the invention. Screen 400 may include notification 408 indicating that the consumer is within a predetermined range of the allocated data provider resource limit. The predetermined range may be set by the consumer (e.g., using an appropriate screen or selectable option), the data provider, a network component, or any other suitable component. In some embodiments, notification 408 may instead or in addition indicate that the user has reached the allocated resource limit (i.e., the range is zero).

Screen 400 may include selectable options for several actions that the consumer may take in response to being informed that the consumer is within the predetermined range of the allocated resource limit. For example, screen 400 may include option 410 for preventing particular users or devices from using data provider resources. In response to receiving a user selection of option 410, the electronic device may display a listing of users or devices to prevent from accessing data provider resources. Alternatively, screen 400 may include an option for allowing particular users or devices to access data provider resources. Once particular users or devices have been selected, the data provider or network element downstream from the resource utilization component (e.g., resource utilization component 110, FIG. 1) may detect when the particular users or devices are requesting data provider resources and deny the requests.

Screen 400 may include option 412 for restricting resource usage to stay within the resource allocation. Option 412 may be displayed when the consumer has not yet reached the allocated storage limit, for example when the user is within a particular or predetermined range of the allocated data provider resource limit. In response to receiving a selection of option 412, the electronic devices within the consumer's network, the network element downstream of the resource utilization component, or the resource utilization component may restrict the amount of resources used. For example, the types of data transmitted over the network may be limited to eliminate or reduce data transfers of large file types (e.g., media files). As another example, data transfers may be restricted based on the protocol or application requesting the data transfer. As still another application, data transfers may be restricted based on the identity of the consumer requesting the transfer (e.g., limit the users who have consumed a disproportionately large amount of data provider resources). As still yet another example, data transfers of media files may be changed to use less resource intensive Codecs or to reduce the size or resolution of displayed media.

Screen 400 may include option 414 for purchasing additional data provider resources. For example, in response to receiving a selection of option 414, the data provider may receive authorization to charge for additional resources. The authorization information may be provided using any suitable approach, for example by receiving credit card or bank account information, a personal pin or passcode associated with the consumer's account (e.g., to authorize an additional purchase on the consumer's account with the data provider), or any other suitable type of authorization information. In some embodiments, the data provider may provide additional resources only to particular consumers in response to receiving purchase or authorization information. For example, the data provider may provide additional resources only to those consumers that provide purchase or authorization information (e.g., only those users that pay can access additional data provider resources, other users must wait for the next period). Screen 400 may be removed by selecting close option 420.

In response to determining that the consumer is nearing or has reached a resource limit, the consumer may perform any suitable action to reduce or manage data consumption. The action taken may depend on or be related to the manner in which data provider resources are quantified and metered. For example, different actions may be taken if the limited data provider resource is an amount of data transferred (e.g., received or transmitted) or bandwidth used.

In some embodiments, the consumer may limit requests for data based on the type of request. For example, the consumer may prevent the download of media data, but allow or permit the download of web pages or other non-media intensive transfers. To do so, the consumer may limit data requests based on the data type of the request (e.g., as identified by a packet header or other metadata associated with the request), based on the application requesting the data (e.g., a media application such as iTunes or QuickTime), the protocol used for the transfer (e.g., BitTorrent), or any other suitable criteria. As another example, the consumer may successively limit video downloads, MMS and SMS data based on the amount by which the consumer is below the allocated resource limit. As still another example, the consumer may reduce the size of transmitted media files by changing the Codec used (e.g., from lossless to lossy), the resolution or size of displayed media, or any other media quality attribute that can be reduced to reduce data provider resources consumed. Alternatively, or in addition, attributes of the transfer of the media file may be changed. In some embodiments, the consumer may further limit the types of data provided in a single interface. For example, the consumer, when loading a web page that includes video or audio, may not automatically start playing back the video or audio but await an instruction from the user (e.g., a user selection of the video or audio), thus indicating that the user has an interest in the media (instead of indeterminately providing audio).

In some embodiments, the consumer may instead or in addition reschedule or cancel processes requesting data of lesser importance. For example, a consumer may cancel or delay auto-update processes (e.g., virus scan updates), automatic requests for new mail, RSS feed detectors, automatically updating web pages or screens (e.g., Gamecast screens or live blogs for following live sporting or news events), or any other suitable process. In some embodiments, the consumer may only enable a particular list of authorized processes. For example, the consumer operating system may identify essential processes that remain enabled independent of the data resource status. As another example, the operating system may identify processes of different levels of importance that are enabled or disabled based on a particular amount of data provider resources still available (e.g., enable lower level processes when more data provider resources are available). Such an approach may in addition prevent malware, spyware, or other malicious applications or processes from operating properly. In some embodiments, the consumer may include user-selected or user identified processes among those to continue (e.g., with the operating system essential processes). This may allow the user to continue to operate the device with minimal inconvenience while reducing the data provider resources used.

In some embodiments, the consumer may reschedule data transferring intensive processes. For example, if the data provider resources are measured or quantified in terms of bandwidth used, the consumer may reschedule or delay bandwidth intensive processes for a time when the consumer is not performing any other data transfers. As another example, the consumer may slow down or reduce the requested bandwidth for a particular data transfer to remain within the allocated resource limits. As another example, the consumer may reschedule or delay scheduled tasks based on detected data usage (e.g., reschedule a scheduled auto-update, or delay refreshing an application screen). Such an approach may be particularly effective when the data provider metering is based on the day or time of day (e.g., re-schedule processes for mid-day or late night, when fewer data processing resources are used).

In some embodiments, the consumer may be operative to receive and transmit data on different communications networks. For example, the consumer may be operative to transmit data over a Wi-Fi connection provided by a wireless router connected to a cable modem and a cellular network (e.g., a 3G network). The consumer may have different data provider resource limits based on the particular network used. For example, the consumer may have a large resource limit associated with the Wi-Fi connection, and no resource limit associated with the cellular connection (which may be slower). In response to detecting that the consumer is nearing the Wi-Fi resource limit, the consumer may switch ongoing and subsequent data transfers to the cellular network. For example, the consumer may automatically switch the data transfer to a different communications network to avoid exceeding a data provider resource limit. As another example, the consumer may prompt the user to switch to a different network.

Figure 5:
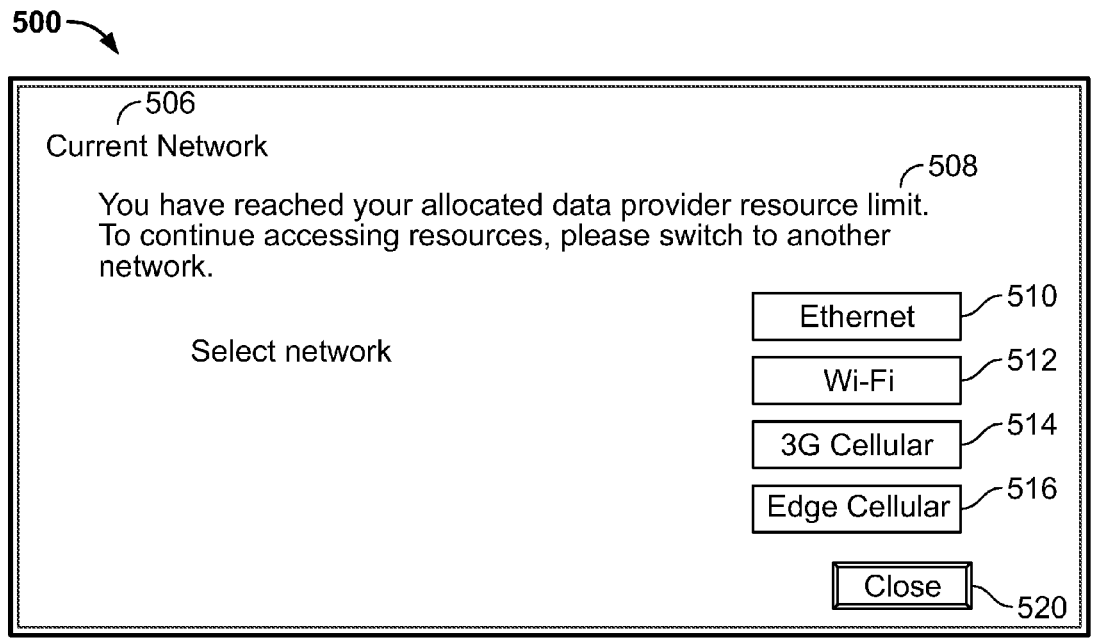
FIG. 5 is an illustrative screen prompting a user to switch networks in accordance with at least one embodiment of the invention.

FIG. 5 is an illustrative screen prompting a user to switch networks in accordance with at least one embodiment of the invention. Screen 500 may include notification 508 indicating to the user that the allocated data provider resource limit for the current network (identified by indication 506) has been reached. In response to determining that the limit for the current network has been reached, the resource utilization component may identify other networks available to the consumer for which allocated data provider resources remain. For example, if a consumer has consumed all allocated cellular resources (e.g., 3G resources), the resource utilization component may identify a Wi-Fi or Ethernet network for which resources are available. Screen 500 may include selectable options for each identified available network. For example, screen 500 may include Ethernet option 510, Wi-Fi option 512, 3G cellular network option 514 and EDGE cellular network option 516. In some embodiments, the displayed options may identify networks by unique identifiers, such as by name (e.g., so that several networks of the same type, such as Wi-Fi, may be available for selection). In response to receiving a user selection of a network, the consumer may direct communications circuitry to switch to the selected network and perform the data transfer operation requested by the consumer. Screen 500 may include any suitable information associated with each identified network, including for example the amount of resources available for each network, the penalty for exceeding the resources on each network, or any other suitable information related to particular networks.

To ensure that the most efficient or effective network is used, the resource utilization component may recommend a particular network to which to switch. The resource utilization component may recommend a particular network based on any suitable criteria, including for example the speed of available networks (e.g., recommend the fastest network), the available resources on each network (e.g., recommend the network with the most resources available), the type of data transfer operation requested (e.g., request a slower network for non-intensive transfers), or any other suitable criteria. The resource utilization component may further recommend or switch to particular networks for specific tasks or based on particular applications (e.g., use Wi-Fi for media transfers, 3G for regular web browsing, and EDGE for checking and receiving e-mail). In some embodiments, the resource utilization component may dynamically and automatically switch between available networks based on the one or more criteria. In some embodiments, particular applications, data transfer types (e.g., protocols or file types), or other types of data provider resource use may be associated with different networks (e.g., check e-mail on cellular network but perform BitTorrent transfers over Wi-Fi or Ethernet).

If no network is available, screen 500 may not include any selectable options but may instead display a screen from which the user may purchase additional data provider resources for one or more networks. Alternatively, screen 500 may indicate to the user that no further data transfers will be available until the next subscription period begins. Screen 500 may be removed by selecting close option 520.

In some embodiments, a consumer may direct a resource utilization component (e.g., a router) to monitor received data based on the source or originator of the data. In particular, the consumer may direct the resource utilization component to distinguish between data received as a result of a consumer request to receive data (e.g., a consumer request to check for new email, download media, surf the Internet) and unsolicited data transmitted to the user using the data provider resources. For example, the resource utilization component may be operative to log and quantify the number of unsolicited pings or attempted hacks of the consumer. The consumer may in turn provide that information to the data provider to ensure that data transfers not initiated or requested by the consumer are not included in the measured data provider metering. In some embodiments, the consumer may account for unsolicited data transfers when determining the amount of data provider resources have been consumed and remain available for consumption.

To more particularly manage data transfers to different devices owned or operated by a same user (e.g., different computers and mobile devices within a same network managed by a consumer of data provider services), the user may distribute the data provider resources available to the user (e.g., to the user's account or network) to each of the devices or persons using the network. For example, a network administrator may allocate a particular amount of data provider resources (e.g., a particular amount or percentage of allocated data transfers) to each device on the network (e.g., to each device identified by the network administrator). As another example, the network administrator may instead or in addition allocate a particular amount of data provider resources to each user of the network (e.g., based on log-in or authentication information provided to access the network).

The network administrator may determine the amount of resources to allocate to each device or user using any suitable approach. For example, the network administrator may associate different amounts of resources based on the type of device used (e.g., a mobile computing device or a computer). As another example, the network administrator may associate different amounts of resources based on the type of user or frequency with which the user accesses the network (e.g., a guest user, a regular user, or a system administrator). In some embodiments, the network administrator may monitor the devices and users using the network and data provider resource to allocate available resources based on prior use. For example, the network administrator may determine that a particular user or device uses a large or small amount of data provider resources, and accordingly allocate a small or large amount of resources to the particular user or device. As another example, the network administrator may determine the percentage of resources used by each device or user and allocate available data provider resources based on the determined percentages of prior use. If the network administrator knows of or detects an anomalous prior usage (e.g., a particular user operated a bandwidth intensive application due to a seasonal or one-time project), or expects an anomalous future usage (e.g., a user is away on vacation for a certain amount of time), the network administrator may account for the anomalous use when allocating data provider resources.

As each device or user consumes data provider resources, the network administrator may monitor the consumption and provide reports, notices, reminders and alerts to each of the devices or users within the network. For example, the network administrator may provide any of the reports, notices, reminders and alerts describe above in connection with the consumption of a particular data provider resource consumer. When a user or device approaches or reaches the allocated limit of data provider resources, the network administrator may take any suitable action. In some embodiments, the particular user or device may be prevented from using additional data provider resources until the resources are again re-allocated (e.g., during the next tier period). For example, the network administrator may ignore or deny all requests from the particular user or device for data provider resources and may in addition provide a message indicating that the user has reached his allocated resource limit. The message may invite the user, for example, to request that the network administrator re-evaluate the data provider resource allocation, or suggest that the user identify another device or network with which to access data provider resources.

In some embodiments, the network administrator may re-allocate resources such that a user or device that has reached or is approaching an initial allocation limit may have additional resources available. This may require the network administrator to reduce the allocation of one or more other users or devices, or to maintain an overflow or reserve of resources available for such occasions. Alternatively, the network administrator may allow the user or device to exceed the allocated resources in exchange for an additional charge (e.g., a payment or penalty). For example, the network administrator may allow the user or device to exceed the allocated resources in exchange for an agreement to pay a predetermined penalty or the penalty given by the data provider (e.g., in response to the user selecting an option agreeing to the penalty).

Figure 6:
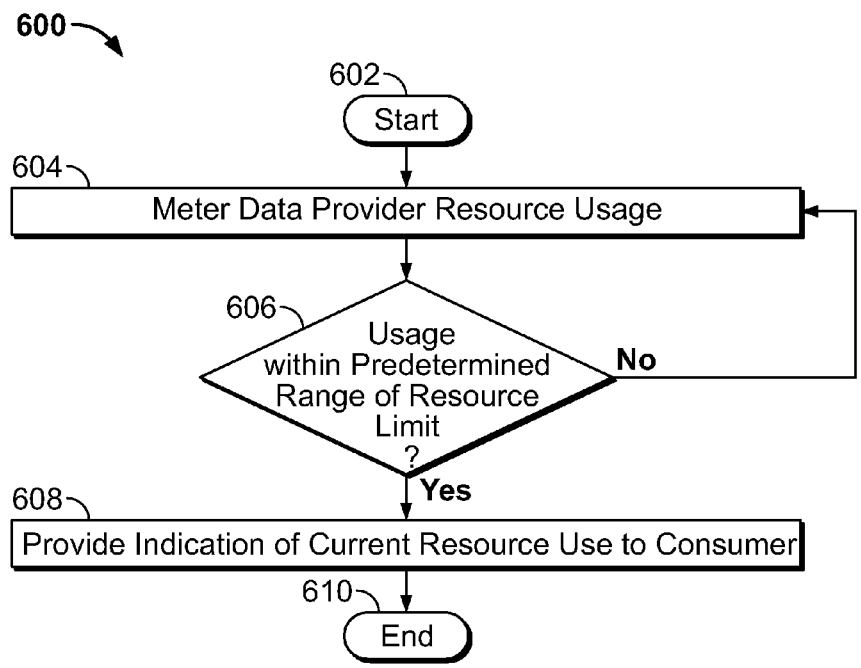
FIG. 6 is a flowchart of an illustrative process for providing an indication of current resource use to a consumer in accordance with at least one embodiment of the invention.

FIG. 6 is a flowchart of an illustrative process for providing an indication of current resource use to a consumer in accordance with at least one embodiment of the invention. Process 600 may begin at step 602. At step 604, the resource utilization component coupled to the electronic device may meter data provider resource usage. For example, the resource utilization component may detect and monitor the data provider resources consumed by a particular consumer. In some embodiments, the resource utilization component may monitor the data provider resources consumed by several consumers within a network that is connected to a resource utilization component providing access to a remote network. At step 606, the resource utilization component may determine whether the usage of the consumer is within a predetermined range of the data provider resource limit. For example, the resource utilization component may compare the current resource usage of the consumer (e.g., within a particular period) with the limits set by the data provider and determine whether the difference falls within a predetermined range. The range may be determined using any suitable approach, and be fixed or change with time (e.g., based on the amount of time left in the period). For example, the range may be a percentage or amount of data provider resources still available. As another example, the range may be zero (e.g., the consumer has reached the data provider resource limit). As still another example, the range may be determined dynamically based on the rate of use of data provider resources, the time left in the period, known or expected variations in data resource use (e.g., based on prior or monitored data resource use), combinations of these, or any other suitable criteria for dynamically determining a range.

If the resource utilization component determines that the usage of the consumer is not within the predetermined range of the data provider resource limit, process 600 may return to step 604 and continue to meter data provider resource usage of the consumer. If, at step 606, the resource utilization component instead determines that the usage of the consumer is within the predetermined range, process 600 may move to step 608. At step 608, the resource utilization component may provide an indication of current resource use to the consumer. For example, the resource utilization component may provide to the consumer information related to the user's current resource usage, expected resource usage, resources remaining for the period, or any other suitable information regarding data provider resource use. In some embodiments, the resource utilization component may provide options for managing data provider resources to the consumer. For example, options for reducing resource use, purchasing or accessing additional resources, preventing particular users or electronic devices from consuming resources, or any other suitable option for managing data provider resource consumption. Process 600 may then end at step 610.

Thus it is seen that computers and other network devices capable of monitoring data consumption, and methods and apparatus for scheduling computer activities to consume data during periods of lower data prices, have been provided. It will be understood that the foregoing is only illustrative of the principles of the invention, and that various modifications can be made by those skilled in the art without departing from the scope and spirit of the invention, and the present invention is limited only by the claims that follow.

What is claimed is:

1. A method for managing data provider resource consumption, comprising:

monitoring, using a device consuming data provider resources, data provider resource consumption by the device over a first communications network;

determining, using the device, that the data provider resource consumption is within a predetermined range of a data provider resource limit;

automatically providing a notice related to the consumed data provider resources using the device in response to determining that the data provider resource consumption is within the predetermined range of the data provider resource limit;

limiting access to data provider resources, by the device, in response to the device determining that the data provider resource consumption is within the predetermined range of the data provider resource limit;

identifying a restricted set of data provider resource usages, wherein the identified set comprises at least one of:

data provider resource usage by a particular electronic device;

data provider resource usage by a particular process;

data provider resource usage using a particular communications protocol;

data provider resource usage for a particular type of data transfer; or data provider resource usage for a particular type of data;

detecting that a requested use is within the identified set; and preventing access to the data provider resources for the requested use in response to the detecting.

2. The method of claim 1, wherein:

monitoring further comprises monitoring during a subscription period; and the data provider resource limit comprises a data provider resource limit during the subscription period.

3. The method of claim 1, further comprising:

providing an option for preventing consumption of data provider resources beyond the data provider resource limit.

4. The method of claim 1, further comprising:

providing an option for accessing additional data provider resources beyond the data provider resource limit.

5. The method of claim 4, wherein providing further comprises receiving purchase information for accessing additional data provider resources.

6. The method of claim 1, wherein limiting access to data provider resources occurs automatically.

7. The method of claim 1, wherein the identified set comprises data provider resource usage by a particular process, and wherein the particular process comprises at least one of a scheduled download, an auto-update, or a rogue process.

8. The method of claim 1, wherein the identified set comprises data provider resource usage by a particular application, and wherein the particular application is not included in a list of authorized applications.

9. The method of claim 6, further comprising adjusting a quality of transferred media.

10. The method of claim 9, wherein adjusting further comprises at least one of changing the resolution of transferred media, changing the display size of transferred media, or changing the codec used for decoding the transferred media.

11. The method of claim 1 wherein the notice further comprises an estimation of expected future data provider resource consumption for a particular period.

12. A method for managing the consumption of data, comprising:

monitoring, using at least one of a plurality of electronic devices, data consumption by the plurality of electronic devices, wherein the plurality of electronic devices consume data through a common account of a data provider;

determining, using the at least one of the plurality of electronic devices, that the data consumption has reached a predetermined resource limit associated with the common account;

automatically indicating, using the at least one of the plurality of electronic devices, to at least one other one of the plurality of electronic devices that the predetermined resource limit has been reached;

identifying, in response to the determining, at least one of the plurality of electronic devices based on the data consumed by the identified at least one of the plurality of electronic devices; and managing access of the identified at least one of the plurality of electronic devices to data, wherein managing comprises reducing the data available to the identified electronic device, and wherein reducing comprises at least one of:
  preventing the identified electronic device from transferring a particular type of data;
  preventing the identified electronic device from transferring data using a particular communications protocol;
  preventing the identified electronic device from consuming data using a particular application; or
  preventing the identified electronic device from consuming data at a particular time of day or week.

13. The method of claim 12, wherein monitoring further comprises monitoring individual data consumption by each of the plurality of electronic devices.

14. The method of claim 12, wherein identifying further comprises identifying at least one electronic device consuming a disproportionately large amount of data and at least one electronic device consuming a disproportionately small amount of data.

15. The method of claim 12, wherein managing further comprises at least one of:
  preventing the identified electronic device from consuming data;
  changing attributes of a transferred media file;
  changing attributes of a transfer of a media file;
  restricting particular programs from consuming data; or
  receiving purchase authorization from the identified electronic device to purchase access to additional data.

16. The method of claim 12, further comprising:
  associating a resource limit with each of the plurality of electronic devices;
  detecting that one of the plurality of electronic devices has reached the resource limit associated with the detected electronic device; and
  automatically providing an indication that the resource limit has been reached to the one of the plurality of electronic devices.

17. The method of claim 16 further comprising directing the one of the plurality of electronic devices to at least one of:
  limit data consumed; or
  purchase access to additional data.

18. A non-transitory computer readable memory medium comprising program instructions for managing data provider resource consumption by a device, wherein the program instructions are executable by a processor in the device to cause the processor to:
  monitor data provider resource consumption by the device over a first communications network;
  determine that the data provider resource consumption is within a predetermined range of a data provider resource limit;
  automatically provide a notice related to the consumed data provider resources in response to the determining that the data provider resource consumption is within the predetermined range of the data provider resource limit; and
  automatically limit access to data provider resources in response to the determining that the data provider resource consumption is within the predetermined range of the data provider resource limit;
  wherein, in limiting access to data provider resources, the program instructions are executable to cause the processor to:
    identify a restricted set of data provider resource usages;
    detect that a requested use is within the identified set; and
    prevent access to the data provider resources for the requested use in response to the detecting;
  wherein the identified set comprises at least one of:
    data provider resource usage by a particular user;
    data provider resource usage by a particular electronic device;
    data provider resource usage by a particular application;
    data provider resource usage by a particular process;
    data provider resource usage using a particular communications protocol;
    data provider resource usage for a particular type of data transfer; or
    data provider resource usage for a particular type of data.

19. The non-transitory computer readable memory medium of claim 18, wherein:
  in monitoring the data provider resource consumption, the program instructions are executable to monitor during a subscription period; and
  the data provider resource limit comprises a data provider resource limit during the subscription period.

20. The non-transitory computer readable memory medium of claim 18, wherein the program instructions are executable to:
  provide an option for preventing consumption of data provider resources beyond the data provider resource limit.

21. The non-transitory computer readable memory medium of claim 18, wherein the program instructions are executable to:
  provide an option for accessing additional data provider resources beyond the data provider resource limit.

22. The non-transitory computer readable memory medium of claim 18, wherein the identified set comprises data provider resource usage by a particular application, and wherein the particular application is not included in a list of authorized applications.

23. The non-transitory computer readable memory medium of claim 18, wherein the program instructions are executable to:
  adjust a quality of transferred media.

24. The non-transitory computer readable memory medium of claim 23, wherein, in adjusting a quality of transferred media, the program instructions are executable to cause the processor to perform at least one of:
  changing the resolution of transferred media, changing the display size of transferred media, or changing the codec used for decoding the transferred media.

* * * * *